(12) United States Patent
Liu

(10) Patent No.: US 12,299,518 B2
(45) Date of Patent: May 13, 2025

(54) SELF-TUNING RADIO-FREQUENCY IDENTIFICATION TAGS

(71) Applicant: SML Intelligent Inventory Solutions LLC, Plano, TX (US)

(72) Inventor: Yichang Liu, Holly Springs, NC (US)

(73) Assignee: SML INTELLIGENT INVENTORY SOLUTIONS LLC, Plano, TX (US)

( * ) Notice: Subject to any disclaimer, the term of this patent is extended or adjusted under 35 U.S.C. 154(b) by 24 days.

(21) Appl. No.: 18/262,477

(22) PCT Filed: Jan. 24, 2022

(86) PCT No.: PCT/US2022/013498
§ 371 (c)(1),
(2) Date: Jul. 21, 2023

(87) PCT Pub. No.: WO2022/159806
PCT Pub. Date: Jul. 28, 2022

(65) Prior Publication Data
US 2024/0078407 A1 Mar. 7, 2024

Related U.S. Application Data

(60) Provisional application No. 63/199,755, filed on Jan. 22, 2021.

(51) Int. Cl.
*G06K 19/06* (2006.01)
*G06K 19/077* (2006.01)
(Continued)

(52) U.S. Cl.
CPC . *G06K 19/07786* (2013.01); *G06K 19/07758* (2013.01); *G06K 19/0779* (2013.01);
(Continued)

(58) Field of Classification Search
CPC ....... G06K 19/07749; G06K 19/07786; G06K 19/0726; G06K 19/07758;
(Continued)

(56) References Cited

U.S. PATENT DOCUMENTS 11,362,423 B2* 6/2022 Takeuchi ................. H04B 5/26
11,392,784 B2* 7/2022 Ikemoto ............... H01Q 1/2208
(Continued)

FOREIGN PATENT DOCUMENTS

WO 2022159806 A1 7/2022

OTHER PUBLICATIONS

PCT/US2022/013498 Written Opinion and ISR dated Apr. 28, 2022, 14 pages.

*Primary Examiner* — Daniel St Cyr
(74) *Attorney, Agent, or Firm* — Boisbrun Hofman, PLLC

(57) ABSTRACT

A radio-frequency identification (RFID) tag, wherein an operational characteristic of the tag is susceptible to influence by a material comprising an object to which it is attached, comprising: a substrate comprising an attachment region and a flap region, the attachment region for coupling the RFID tag to a surface of an object; and, an RFID inlay formed on the substrate, comprising a loop antenna and a dipole antenna, the loop antenna and the dipole antenna each having first and second portions within the attachment and flap regions, respectively, wherein a relative portion of the loop antenna within the attachment region has a positive influence on the operational characteristic when attached to an object and a relative portion of the dipole antenna within the attachment region has a negative influence on the operational characteristic, whereby the net influence on the operational characteristic by the object can be minimized.

21 Claims, 17 Drawing Sheets

(51) Int. Cl.
  *H01Q 1/22*    (2006.01)
  *H01Q 7/00*    (2006.01)
  *H01Q 9/28*    (2006.01)

(52) U.S. Cl.
  CPC .............. *H01Q 1/2225* (2013.01); *H01Q 7/00* (2013.01); *H01Q 9/285* (2013.01)

(58) Field of Classification Search
  CPC ............. G06K 19/07779; G06K 19/07; G06K 7/10336; H01Q 1/2225; H01Q 7/00; H01Q 9/285; H01Q 1/243
  USPC .................................................. 235/492, 487
  See application file for complete search history.

(56) References Cited

U.S. PATENT DOCUMENTS

| | | | |
|---|---|---|---|
| 11,501,129 B2 * | 11/2022 | Liang | ........................ H01Q 1/38 |
| 12,005,670 B2 * | 6/2024 | Yamawaki | ............. B65H 35/10 |
| 12,039,394 B2 * | 7/2024 | Shimada | .............. H01Q 1/2283 |
| 2007/0279231 A1 | 12/2007 | Cheng et al. | |
| 2009/0096696 A1 | 4/2009 | Joyce, Jr. et al. | |
| 2019/0073579 A1 | 3/2019 | Kato | |
| 2019/0130239 A1 | 5/2019 | Kimura et al. | |

* cited by examiner

| TEST CASES | | | | | |
|---|---|---|---|---|---|
| SENSITIVITY AND FREQUENCY SHIFT | 14mm INSTALLATION DEPTH | 16mm INSTALLATION DEPTH | 18mm INSTALLATION DEPTH | 20mm INSTALLATION DEPTH | 22mm INSTALLATION DEPTH |
| 27mm DIAMETER METAL CAP | GB4U8 GB26aU8 | GB4U8 GB26aU8 | GB4U8 GB26aU8 | GB4U8 GB26aU8 | GB4U8 GB26aU8 |
| 42mm DIAMETER METAL CAP | GB4U8 GB26aU8 | GB4U8 GB26aU8 | GB4U8 GB26aU8 | GB4U8 GB26aU8 | GB4U8 GB26aU8 |
| 65mm DIAMETER METAL CAP | GB4U8 GB26aU8 | GB4U8 GB26aU8 | GB4U8 GB26aU8 | GB4U8 GB26aU8 | GB4U8 GB26aU8 |

FIG. 8

SELF-TUNING RADIO-FREQUENCY IDENTIFICATION TAGS

RELATED APPLICATIONS

This application claims priority from and to U.S. Provisional Application No. 63/199,755, filed Jan. 22, 2021, which is incorporated herein by reference.

TECHNICAL FIELD OF THE DISCLOSURE

The present disclosure is directed, in general, to Radio Frequency Identification (RFID) tags and, more specifically, to RFID tags having a "self-tuning" feature for use on a variety of objects comprising different container materials and contents.

BACKGROUND

Radio frequency identification (RFID) uses electromagnetic fields to identify and track tags attached to objects. An RFID tag consists of three different components: an RFID "chip", which is an integrated circuit (IC), and an antenna, both affixed to a substrate. When triggered by an electromagnetic interrogation pulse from an RFID reader device, the tag transmits digital data, usually an identifying inventory number, back to the reader; the number can be used to inventory goods. There are two types of RFID tags; passive tags are powered by energy from an RFID reader's interrogating radio waves, and active tags are powered by a battery and can be read at a greater range from the RFID reader (up to hundreds of meters). Unlike a barcode, an RFID tag does not need to be within the line of sight of the reader, so it may be embedded in the tracked object.

An RFID tag IC has a logic unit that makes decisions and provides memory for stored data, such as a unique product ID. An RFID tag antenna, connected to the tag IC, is the largest part of the tag. The geometry of an antenna is determined by the frequency at which the tag operates; variations in antenna design allow tags to have different properties and behaviors. The antenna can be shaped, for example, as a spiral coil, a single dipole, dual dipoles (one perpendicular to other), or a folded dipole. The antenna is designed for a specific frequency of operation and the designated frequency determines an effective antenna length. A substrate holds the RFID IC and antenna together; an antenna can be deposited or printed on the substrate, and the IC is then attached to the antenna and the substrate. A substrate can be made from flexible material such as thin plastic, but it may also be made from rigid material. Most passive tags use substrates made from flexible material with a thickness of 100 to 1000 nm. Suitable materials for a substrate include polymer, PVC, Polyethylenetherephtalate (PET), phenolics, polyesters, styrene, and even paper. The substrate material may affect the design frequency of the antenna; therefore, the effect of substrate material must be considered during proper tuning of the antenna.

An RFID tag has a nominal operating frequency, normally measured in "free air"; i.e. without any influence on the frequency due to an object, such as a product for sale, to which the tag is attached. Some such objects, such as the metallic lid of a bottle or the liquid contained therein, can negatively influence the readability of an RFID tag. If the right tag is not selected for an object to which it will be affixed, the read range can be greatly reduced, possibly to the point that the tag cannot be read at all. For example, RFID tags have been designed for use on metal objects, which reflect RF energy, or containing liquids (e.g., water), which generally absorb RF energy. Such tags, however, are usually application-specific; i.e., they are designed specifically for the type of container material or content of the product(s) to which they will be affixed. In addition to the composition of an item to be tagged, each item will usually exhibit a "sweet spot" that will maximize the read range of an RFID tag placed thereon; such sweet spots can vary tremendously from item to item and can only be identified via testing for each product. As such, there is a need in the art for improved RFID tag designs that can overcome the deficiencies of prior art tag designs and reduce the influence of the material comprising the object to which the RFID tag will be attached.

SUMMARY

To address the deficiencies of the prior art, disclosed herein is a radio-frequency identification (RFID) tag for use on an object, wherein an operational characteristic of the RFID tag is susceptible to influence by a material comprising the object. The disclosed RFID tag comprises a substrate having an attachment region and a flap region, the attachment region adapted for coupling the RFID tag to a surface of an object; and, an RFID inlay formed on the substrate, the RFID inlay comprising a loop antenna and a dipole antenna, the loop antenna and the dipole antenna each having first and second portions within the attachment and flap regions, respectively, wherein a portion of the loop antenna within the attachment region has a relative positive influence on the operational characteristic when attached to an object and a portion of the dipole antenna within the attachment region has a relative negative influence on the operational characteristic, whereby the net influence on the operational characteristic of the material comprising the object to which the RFID tag will be attached can be minimized. By providing loop antenna and dipole antenna portions within the attachment region that counter-balance the effect of the object material and/or contents on the operational characteristic, the RFID tag can be said to be "self-tuning".

In exemplary embodiments, the relative positive influence of the loop antenna within the attachment region on the operational characteristic increases with the surface area of the object to which the attachment region is coupled; similarly, the relative negative influence of the dipole antenna within the attachment region on the operational characteristic also increases with the surface area of the object to which the attachment region is coupled. The operational characteristic can be the forward link power required to effectively read the RFID tag at a desired operational frequency; the required forward link power can also be specified for a standard distance of an RFID reader from the self-tuning RFID tag. Preferably, the forward link power is relatively consistent for the use of the RFID tag on objects comprising substantially different materials. The operational characteristic can also be the sensitivity of the RFID tag at a desired operational frequency; the desired operational frequency can be, for example, within the standard 902-928 MHlz band. Objects to which the self-tuning RFID tag can be attached, while exhibiting the "self-tuning" characteristic, comprise a container formed from metal, paper, plastic, or glass; the object can further comprise a material within the container, such as a liquid.

In an exemplary embodiment, the substrate is physically defined by a first edge and a second edge and a central folding location, the attachment region comprising the region of the substrate between the central folding location and the first edge and the flap region comprising the region of the substrate between the central folding location and the second edge. In exemplary embodiments, the RFID tag has an overall rectangular shape, wherein the attachment and flap regions are formed on ends thereof, each region having a smaller rectangular area; alternatively, the tag could have a circular, or other, shape to best accommodate the shape of the object, or portion thereof, to which the tag will be attached.

In an exemplary embodiment, the dipole antenna comprises first and second legs originating at a location within the flap region. In such embodiment, the first leg of the dipole antenna is wholly positioned within the flap region of the substrate and the second leg of the dipole antenna extends from the flap region into the attachment region of the substrate. In certain embodiments, the first and second legs of the dipole antenna within the flap region and the attachment region, respectively, are not symmetrical. Similarly, the loop antenna comprises a primary portion and a secondary portion, at least a part of the secondary portion positioned within the attachment region. In an exemplary embodiment, the secondary portion of the loop antenna comprises an elongated stub. In such embodiments, the elongated stub is oriented such that progressively more of the stub overlays an object as a greater area of the attachment region is affixed to the object.

In the exemplary embodiments, the RFID tag further comprises an adhesive means disposed on at least a portion of the substrate in the attachment region, the adhesive means suitable for fixedly attaching the RFID tag to a surface of an object. In such embodiments, the flap region of the substrate is adapted to extend away from the surface of the object to which the RFID tag will be attached. In some embodiments, the substrate comprises first and second opposing surfaces and the RFID inlay is located on only a first surface; in such embodiments, the substrate can serve to insulate the RFID inlay from the surface material of the object to which the tag will be attached. Alternatively, a portion of the RFID inlay could be formed on one side of the substrate and a second portion could be formed on the opposite side, with coupling between the portions through the substrate, if desired for a particular application.

BRIEF DESCRIPTION OF THE DRAWINGS

FIG. 8 provides a table of test cases for comparing performance of the exemplary prior art RFID inlay and the exemplary "self-tuning" RFID inlay at various installation depths on metal caps of various diameters;

DETAILED DESCRIPTION

Products with metallic surfaces or containing liquid can alter the desired frequency chacteristics of an RFID tag. As such, it has been a practice in the prior art to use RFID "flag tags" which have a first portion which is affixed to the product using, for example, an adhesive, and a second "flag" portion that extends outwardly from the product into free air in order to eliminate or minimize the impact of the product container/contents on the frequency response/sensitivity of the RFID tag. It is desirable, however, to minimize the size of the RFID tag, in particular the size of the "flag" portion. The novel RFID tag design disclosed herein helps accomplish those goals and improves the RF performance/sensitivity.

Figure 1:
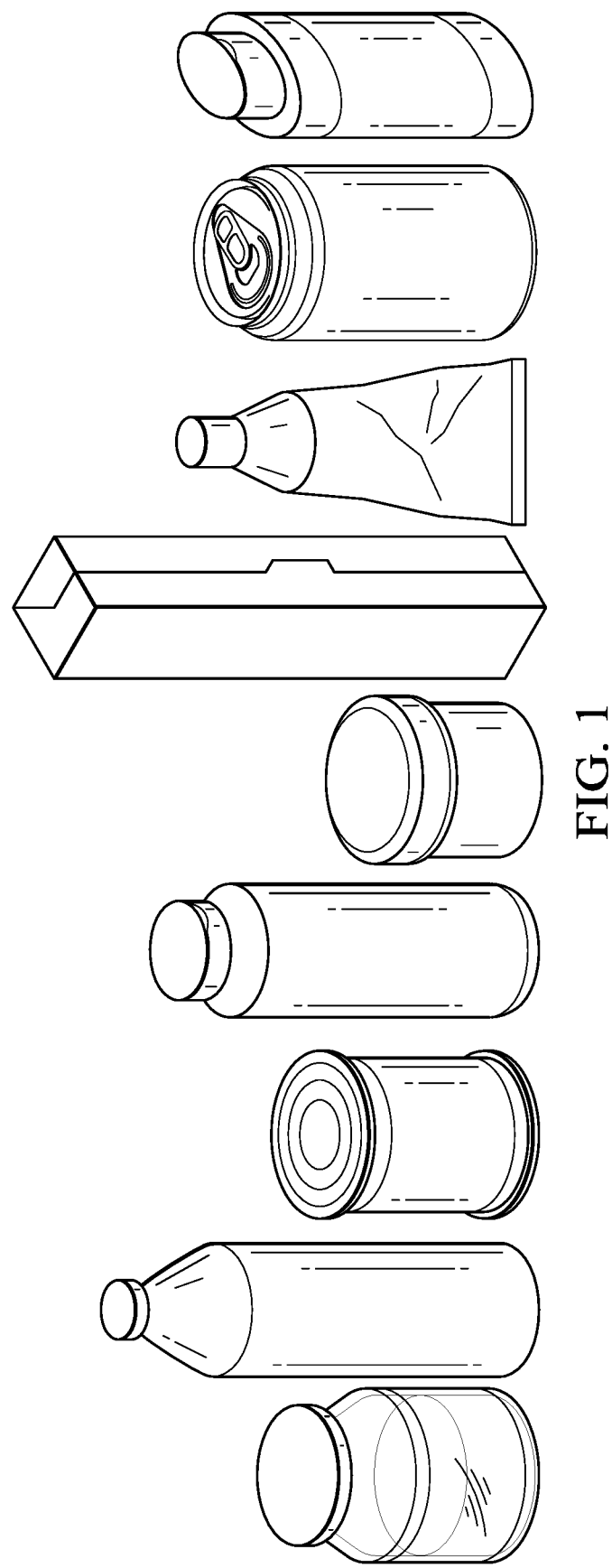
FIG. 1 illustrates an assortment of products having various types of containers and contents.

FIG. 1 illustrates an assortment of products having various types of containers and contents. The products can comprise paper, plastic, glass or metallic containers, or various combinations thereof; such containers may also have a cap or lid comprising a different material, typically plastic or metal. The products can also hold a variety of contents, including various liquids or gels. In the prior art, an assortment of tags might be required, each type designed specifically for certain products. An RFID tag designed according to the principles disclosed herein, however, can yield tags that are adaptable for use on a broad range of products, regardless of the type of container or its contents.

Figure 2:
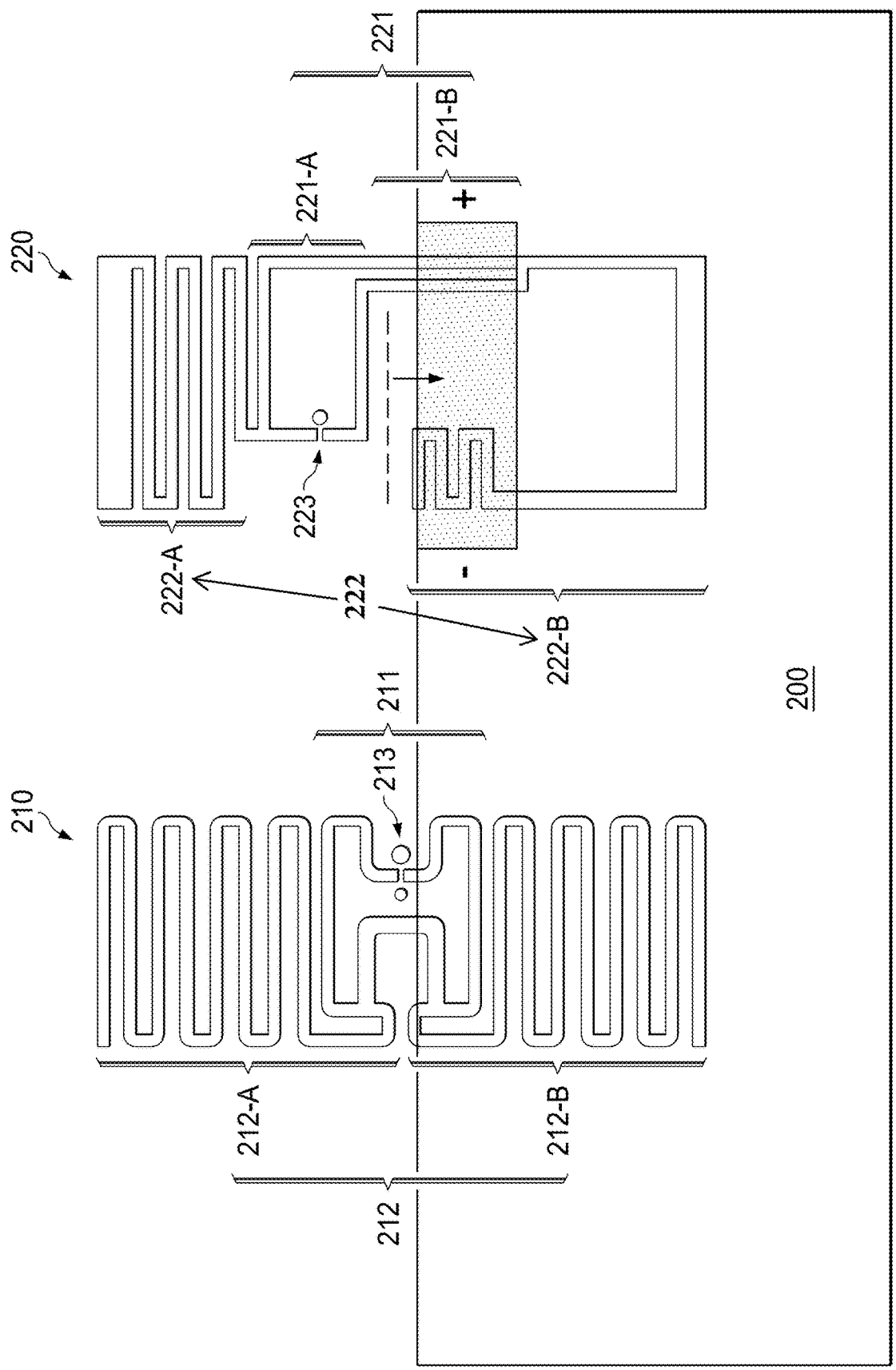
FIG. 2 illustrates a comparison of an exemplary prior art RFID inlay and an exemplary "self-tuning" RFID inlay according to the principles disclosed herein.
Figure 4:
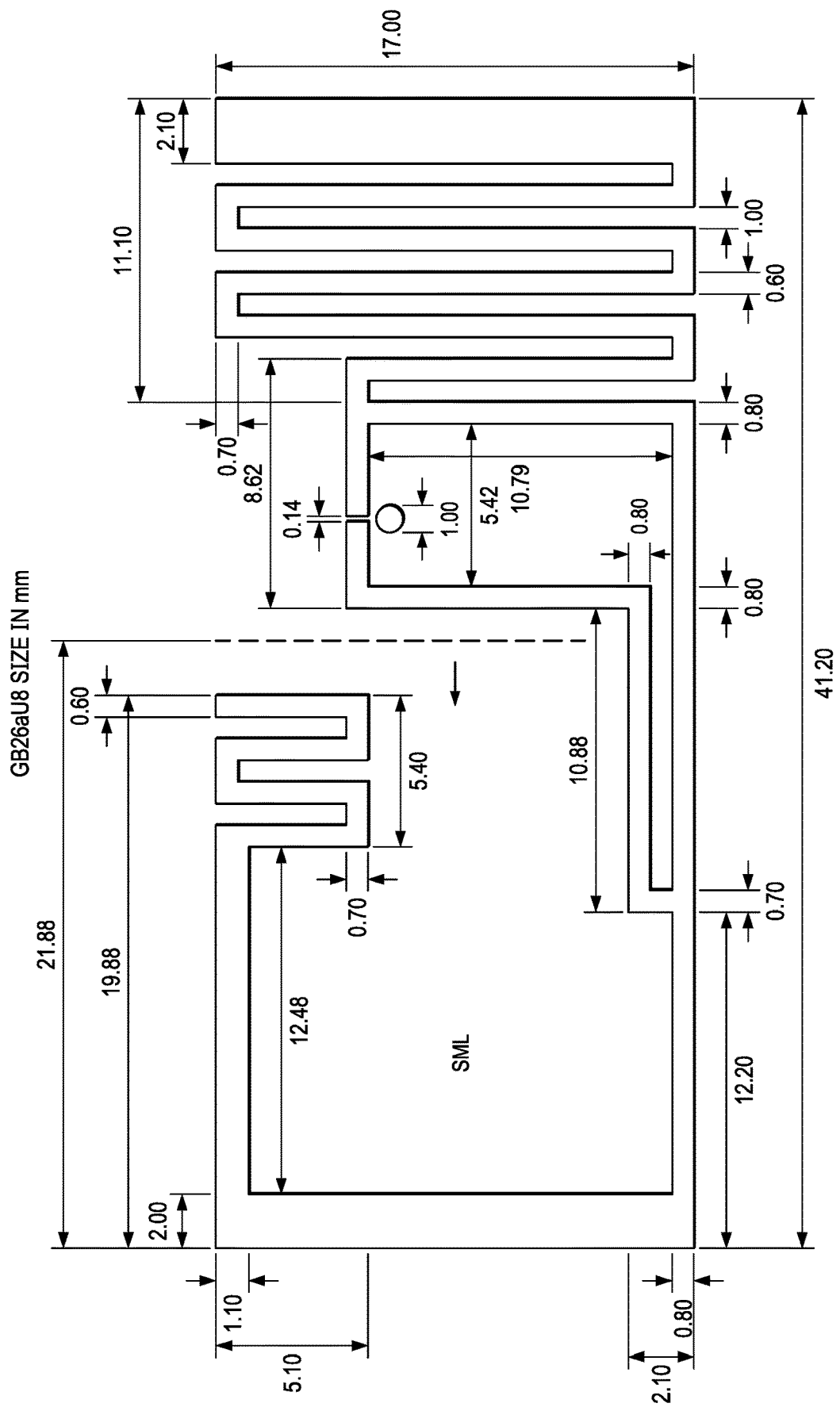
FIG. 4 illustrates actual dimensions of the exemplary "self-tuning" RFID inlay illustrated in FIG. 2.
Figure 5:
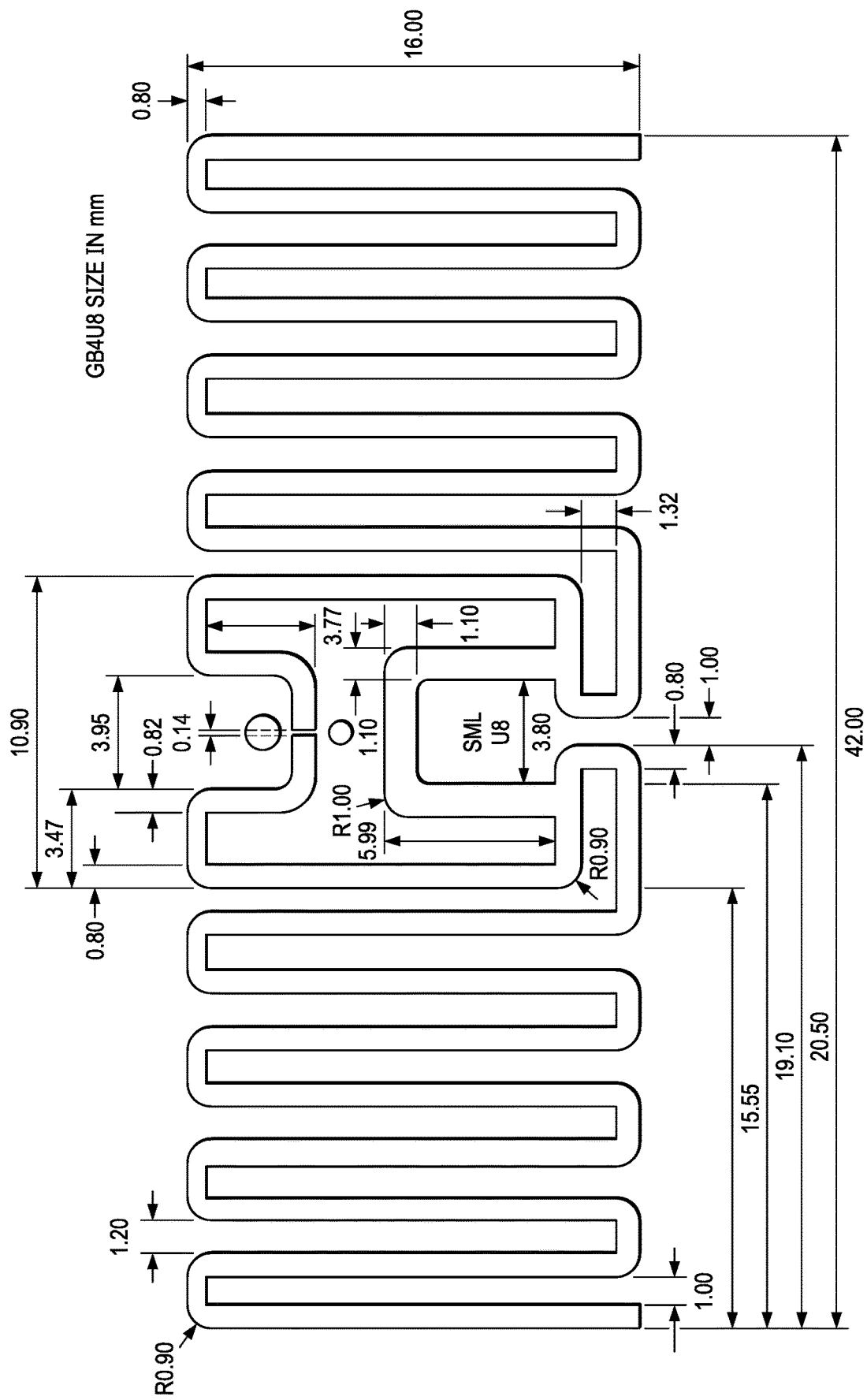
FIG. 5 illustrates actual dimensions of the exemplary prior art RFID inlay illustrated in FIG. 2.

Referring now to FIG. 2, illustrated is a comparison of an exemplary prior art RFID inlay 210 (also referenced hereinafter and in the figures as SML GB4U8) and an exemplary "self-tuning" RFID inlay 220 (also referenced hereinafter and in the figures as SML GB26aU8) designed according to the principles disclosed herein. Specific dimensions for the GB26aU8 "self-tuning" RFID inlay 220 and for GB4U8 RFID inlay 210 are illustrated in FIGS. 4 and 5, respectively; for both inlays, the antennas are formed of aluminum, having a thickness of 9 µm, on a 50 µm PET substrate. Each of the inlays 210, 220 are illustrated as having a portion positioned over an object 200; the portion of each inlay over the object 200 is designed to be within an attachment region of an RFID tag. For example, an inlay can be formed on a substrate (not shown) comprising an attachment region and a flap region, the attachment region adapted for coupling the RFID tag to a surface of an object (e.g., a product for sale), and the flap region designed to extend into free air (i.e., not directly bonded to the object). An RFID tag preferably includes an adhesive means disposed on at least a portion of the substrate in the attachment region, the adhesive means suitable for fixedly attaching the RFID tag to a surface of an object.

The exemplary prior art RFID inlay 210 is characterized by a symmetrical design, including a central loop antenna portion 211 and a dipole antenna portion 212; the dipole antenna portion comprises folded first and second legs 212-A and 212-B extending outwardly, and on opposite sides, from the central loop antenna portion 211. Most such prior art RFID inlays are symmetrical for both the dipole and loop antennas, and the relative size of the loop antenna is chosen to tune the impedance of the dipole antenna to an appropriate value for an RFID integrated circuit (IC; not shown) that is coupled to the loop and dipole antennas, typically at the central location 213.

In contrast to the symmetrical exemplary prior art RFID inlay 210, the exemplary "self-tuning" RFID inlay 220 is characterized by a non-symmetrical design. Like prior art RFID inlay 210, exemplary self-tuning RFID inlay 220 includes a loop antenna portion 221 and a dipole antenna portion 222; the dipole antenna portion 222 comprises folded first and second legs 222-A and 222-B extending outwardly, and on opposite sides, from the central loop antenna portion 221. An RFID IC (not shown) is coupled to the loop and dipole antennas location 223. In contrast to exemplary prior art RFID inlay 210, however, the loop antenna portion 221 (comprising first loop portion 221-A and second loop portion 221-B) is not symmetrical, nor are the folded first and second legs 222-A and 222-B of the dipole antenna portion 222.

The design of exemplary RFID inlay 220 overcomes certain deficiencies of prior art RFID inlay 210; the "self-tuning" design is based on the recognition that some objects, particular those having a metallic surface to which an RFID tag is attached, and/or which contain liquid, cause a negative shift of the desired operational frequency of a conventional RFID tag, which is a function of the dipole antenna portion of the RFID inlay that is proximate the object's surface/contents; conversely, there is a positive shift in the desired operational frequency as a function of the loop antenna portion of an RFID inlay that is proximate the object's surface/contents. By adjusting the configuration of the dipole and loop portions to balance out the negative and positive shifts on the desired operational frequency, an RFID tag can be affixed to different objects over a wider array of container materials/contents while still maintaining good performance. For the exemplary RFID inlay 220 shown in FIG. 2, the loop antenna portion 221 is characterized by a primary loop portion 221-A and a secondary dog-leg portion 221-B (also referred to as an "elongated stub"); as more of the dog-leg portion of the loop antenna 221 overlays the object 200, a greater resulting positive shift in the operational frequency can counter the negative shift resulting from the overlay of the dipole antenna on the object 200. By proportionally adjusting the relative sizes of the dipole and loop portions of the area of a tag that will be affixed to a product—particularly products having a metallic surface or which contain liquid—the influence of the product packaging/contents on the frequency sensitivity of the RFID tag can be minimized. Such designs also allow for more of the RFID tag to be adhered to the product, thereby preferably reducing the size of the "flag" portion of the RFID tag.

Figure 3:
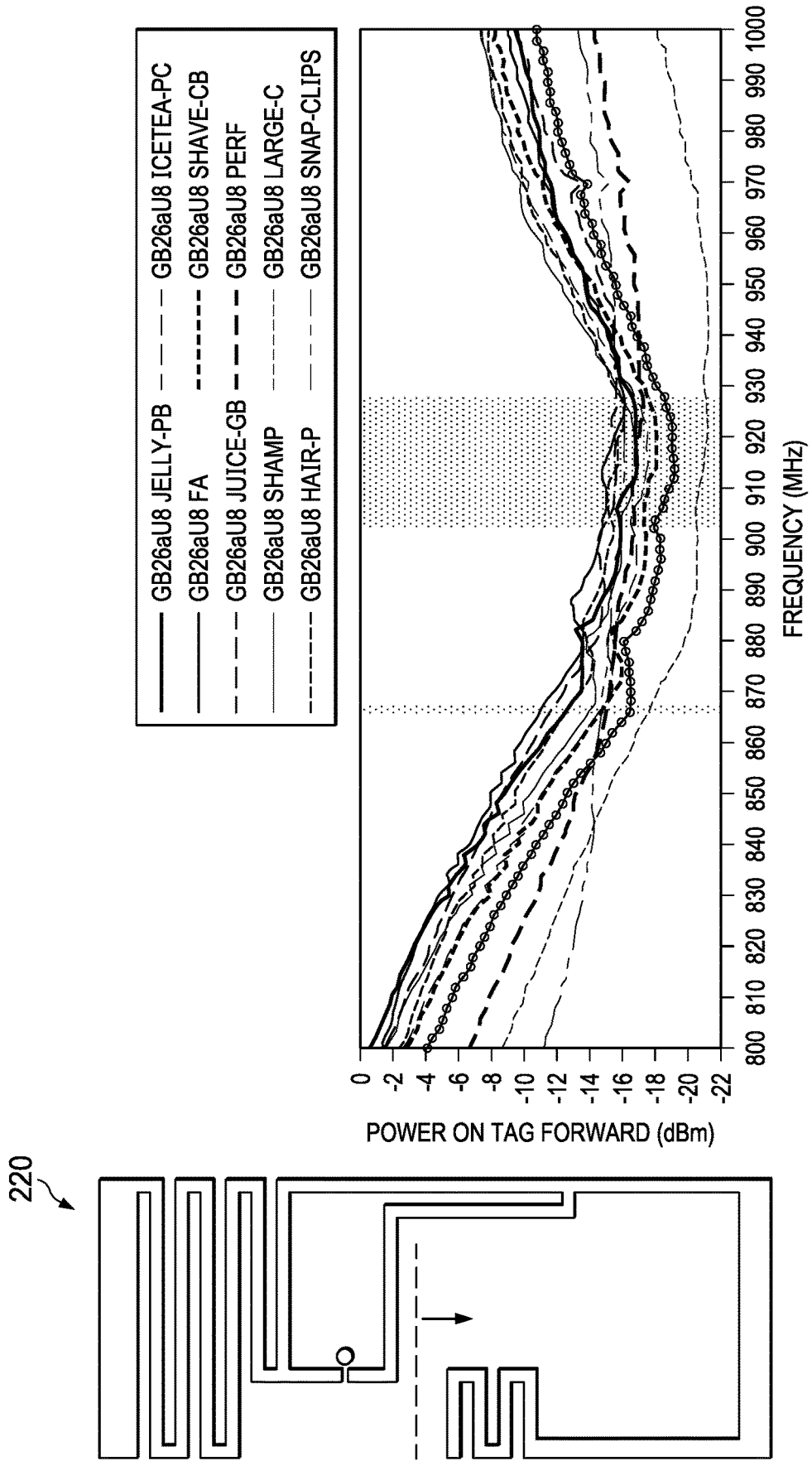
FIG. 3 illustrates a graph of an operational characteristic of the exemplary "self-tuning" RFID inlay of FIG. 2 when attached to various ones of the products illustrated in FIG. 1.

Referring now to FIG. 3, illustrated is a graph of an operational characteristic of the exemplary "self-tuning" RFID inlay (GB26aU8) 220 of FIG. 2 when attached to various products, such as illustrated in FIG. 1; the operational characteristic is the forward transmit power ("POWER ON TAG FORWARD (dBm)") sufficient to read the stored information from the RFID IC. The individual graphs, as identified by the legend in FIG. 3, correspond to measurements of the forward transmit power for the RFID inlay 220 in free air (FA) and when attached to nine different products, including jelly-peanut butter in a plastic jar (JELLY-PB), apple juice in a glass bottle with metal cap (JUICE-GB), shampoo in a plastic bottle (SHAMP), hair product in a metal bottle with plastic cap (HAIR-P), iced tea in a polycarbonate container (ICETEA-PC), shaving cream in metal container (SHAVE-CB), perfume in metal bottle (PERF), and a large metal cap (LARGE-C). As can be seen, there is little variability in the sensitivity on a variety of products/packages and the performance actually improves over the performance of the tag in free air. The range of performance for different mounting "depths" (i.e., varying the size of the loop antenna portion in the attachment zone affixed to an object), and the improved performance of the exemplary "self-tuning" GB26aU8 RFID inlay 220 in comparison to the exemplary prior art GB4U8 RFID inlay 210, will be further illustrated and described with reference to FIGS. 6-16.

Figure 6:
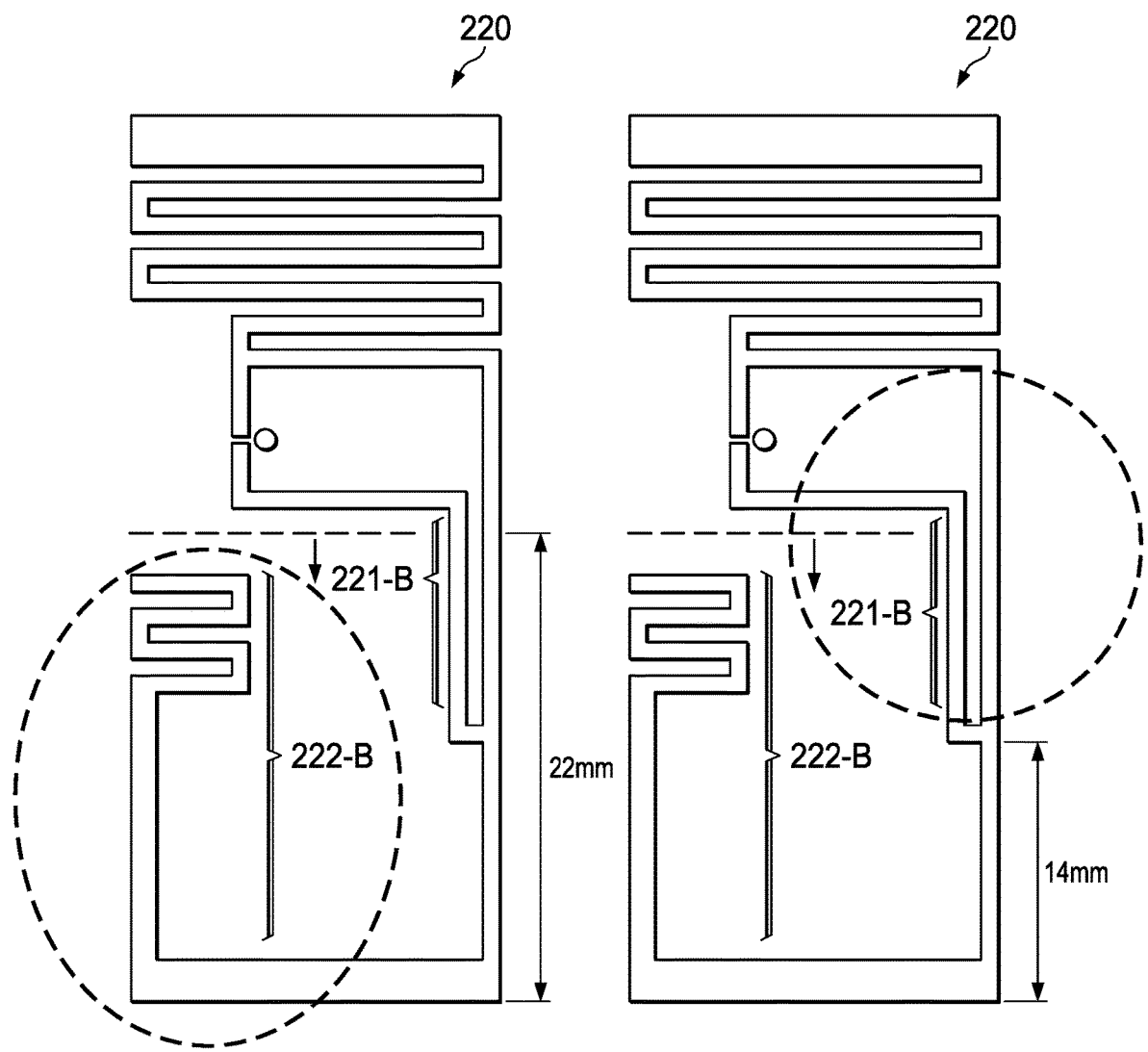
FIG. 6 illustrates different aspects of the exemplary "self-tuning" RFID inlay.

A proof of concept was performed utilizing two basic tests, as illustrated in FIG. 6; one test in which 22 mm of the "self-tuning" GB26aU8 RFID inlay 220 overlapped a metallic surface (fully underlaying the dipole portion 222-B of the attachment portion of the tag and the "self-adjusting" or "tuning" portion 221-B of the loop antenna), and a second test in which only 14 mm of the GB26aU8 RFID inlay 220 overlapped the metallic surface (underlaying part of the dipole portion 222-B of the attachment portion of the tag but none of the "self-adjusting" or "tuning" portion 221-B of the loop antenna). As indicated supra, the proof of concept testing confirmed that when the loop antenna does not overlap the metal surface, the metal surface shifts the dipole frequency lower. When the loop antenna does overlap the metal surface, however, it will shift the loop frequency higher, thereby compensating for the negative shift attributable to the dipole antenna overlaying the metal surface. When installation of the inlay was incrementally varied from 14 mm to 22 mm (as described hereinafter) of overlap of the metallic surface, the increasing overlap of the dipole antenna on the metal surface progressively shifted the operating frequency lower, while the increasing overlap of a portion of the loop antenna progressively shifted the frequency higher, thereby self-adjusting/compensating for the negative shift attributable to the dipole antenna.

Figure 7:
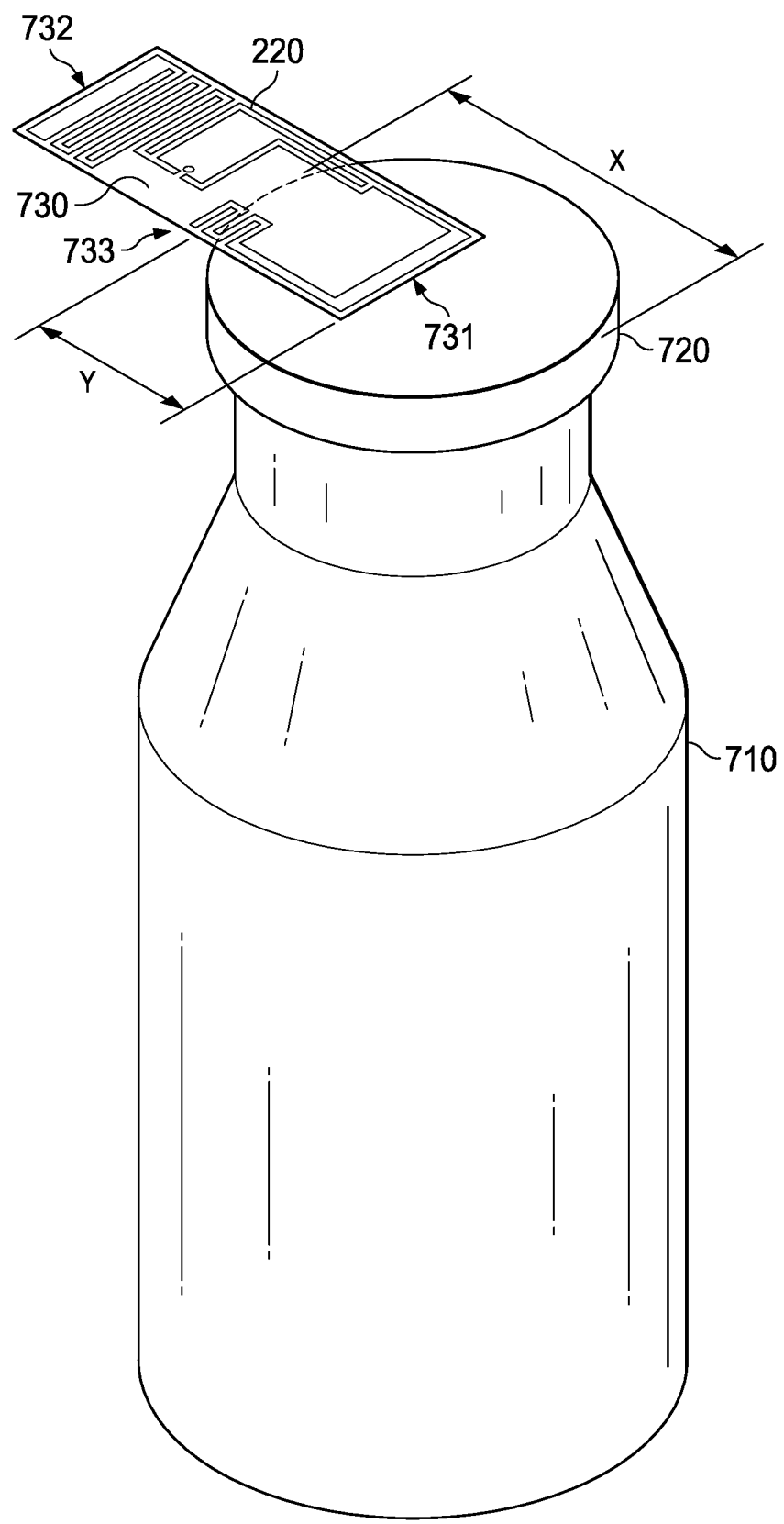
FIG. 7 illustrates the attachment of the exemplary "self-tuning" RFID inlay to a product for use in testing.

Further testing of the design concept, utilizing the GB4U8 RFID inlay 220, was performed on products with metallic caps of various diameters (27 mm/42 mm/65 mm) and at varying overlaps (14 mm/16 mm/18 mm/20 mm/22 mm), and compared with the performance of the exemplary prior art GB4U8 RFID inlay 210. FIG. 7 illustrates the manner in which the inlays were mounted to a product for testing and comparison; the product used during testing comprised a glass container 710 having a metallic lid 720 having various diameters "X" (27 mm/42 mm/65 mm), and the RFID inlays (220 shown) were mounted at various installation depths "Y" ((14 mm/16 mm/18 mm/20 mm/22 mm). The inlays were formed on a substrate 730 physically defined by a first edge 731 and a second edge 732 and a central folding location 733; an attachment region comprises the region of the substrate 730 between the central folding location and the first edge 731 and the flap region comprises the region of the substrate between the central folding location 733 and the second edge 732. In various embodiments of an RFID tag comprising an RFID inlay 220 on a substrate 730, the central folding location 733 can be fixed or variable; e.g., if variable, different locations can be indicated on the tag for different object types to which the tag can be affixed (i.e., different locations for different container types and/or different contents).

RFID devices operating at UHF frequencies are allowed for operation in the Industrial, Scientific, and Medical (ISM) bands under conditions defined in FCC part 15 rules, section 15.247. Section 15.247 defines operation within the bands 902-928 MHz, 2400.0-2483.5 MHz, and 5725-5850 MHz. The 902-9281 MHz band offers optimum range of operation and is usually preferred for supply chain RFID applications. The testing process utilized Voyantic's Tagperformance® Pro system for RFID testing (see: voyantic.com/products/tagformance-pro), and the procedure was characterized by the following steps for each of the test cases indicated in FIG. 8:

1. Place an RFID tag (having either a GB4U8 RFID inlay 210 or GB26aU8 "self-tuning" RFID inlay 220) on metal product caps (27 mm/42 m/65 mm) at varying overlaps (14 mm/16 mm/18 mm/20 mm/22 mm);
2. Place each sample inside an anechoic chamber; and,
3. Close the anechoic chamber and run test using Tagformance Pro software.

Figure 14:
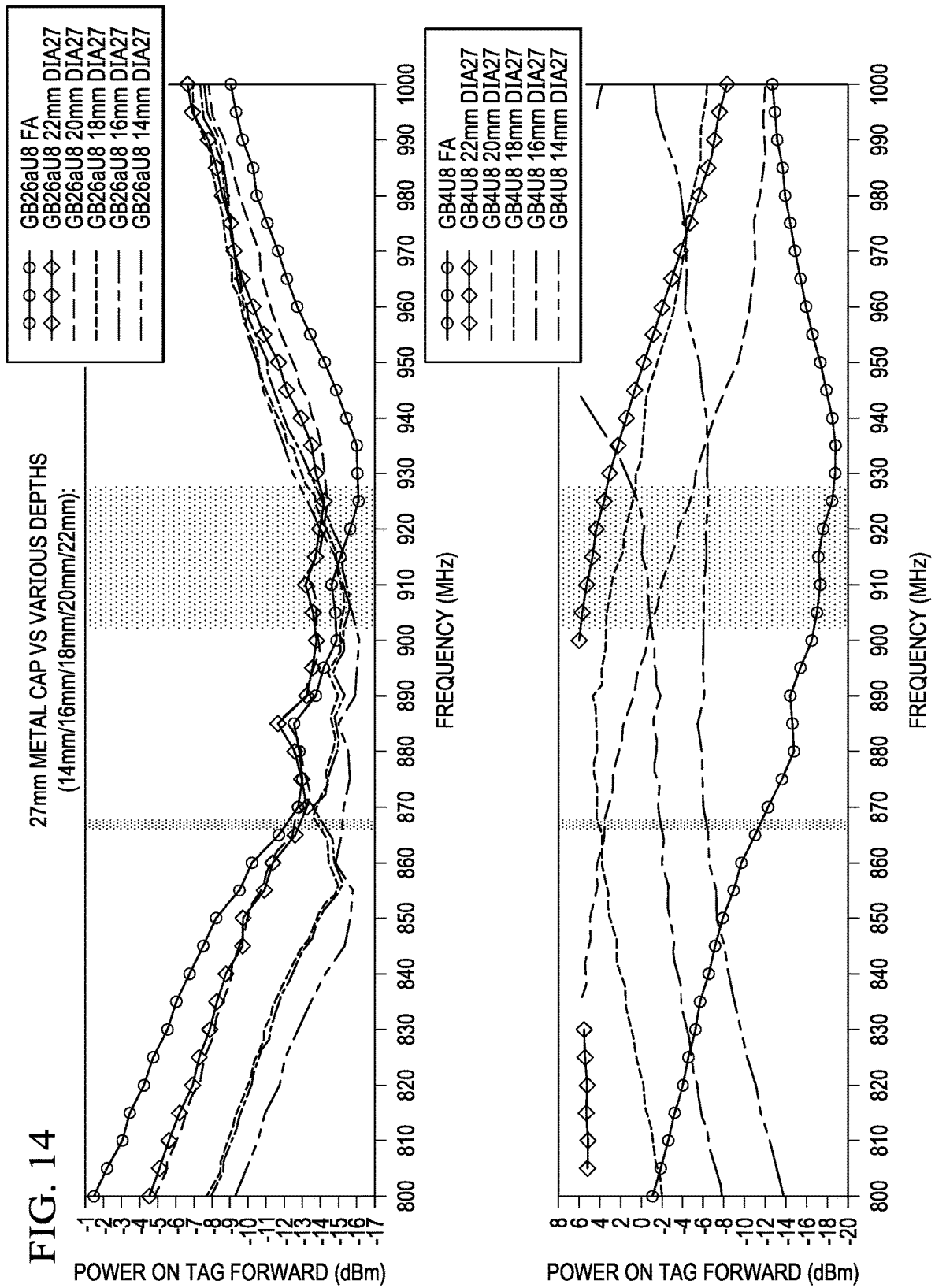
FIG. 14 illustrates graphs of an operational characteristic of the exemplary prior art RFID inlay and exemplary "self-tuning" RFID inlay as a function of various installation depths on 27 mm metal caps.
Figure 15:
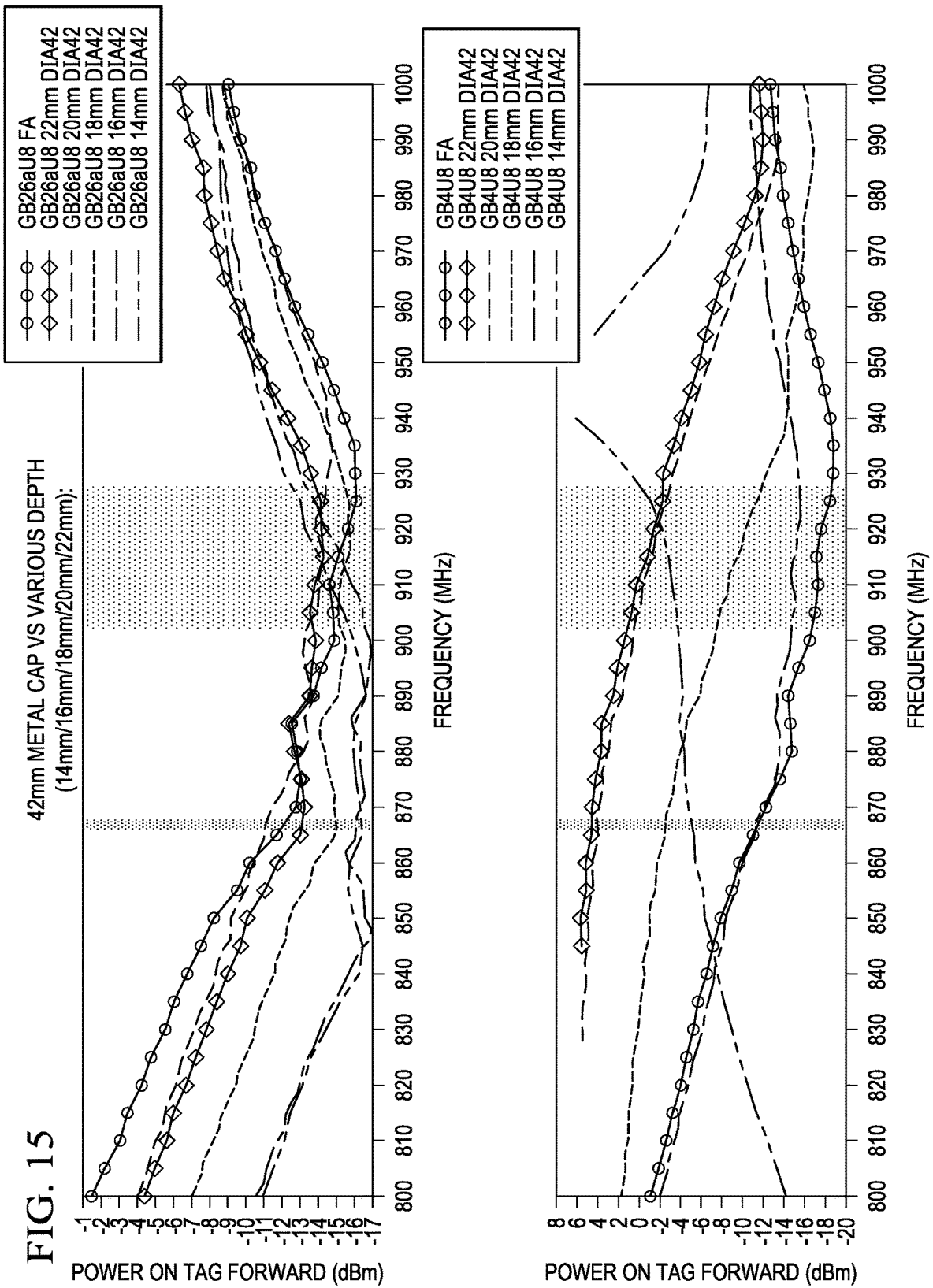
FIG. 15 illustrates graphs of an operational characteristic of the exemplary prior art RFID inlay and exemplary "self-tuning" RFID inlay as a function of various installation depths on 42 mm metal caps.
Figure 16:
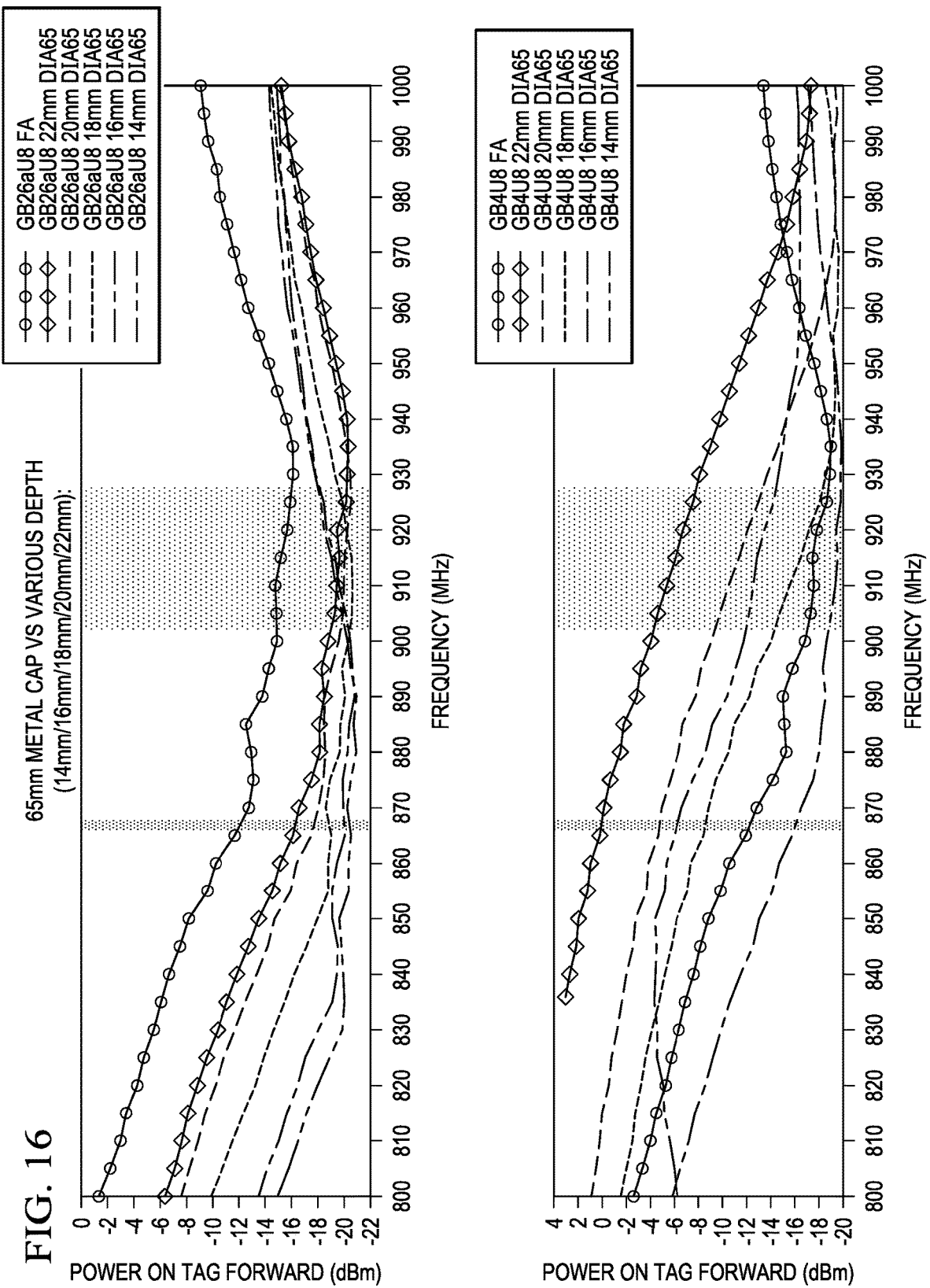
FIG. 16 illustrates graphs of an operational characteristic of the exemplary prior art RFID inlay and exemplary "self-tuning" RFID inlay as a function of various installation depths on 65 mm metal caps; and, FIG. 17 illustrates exemplary alternative RFID inlay designs that could function according to the principles disclosed herein.

FIGS. 9-16 illustrate the measurement results for the test cases identified in FIG. 8; first as a function of varying metallic cap sizes for each installation depth (FIGS. 9-13), and second as a function of varying depths for each cap size (FIGS. 14-16). As can be seen in the graphs, and described hereinafter, variability of the measurement results is significantly less for the self-tuning GB26aU8 RFID inlay 220 than the exemplary prior art GB4U8 RFID inlay 210, both as a function of different metal cap sizes and installation depths.

Figure 9:
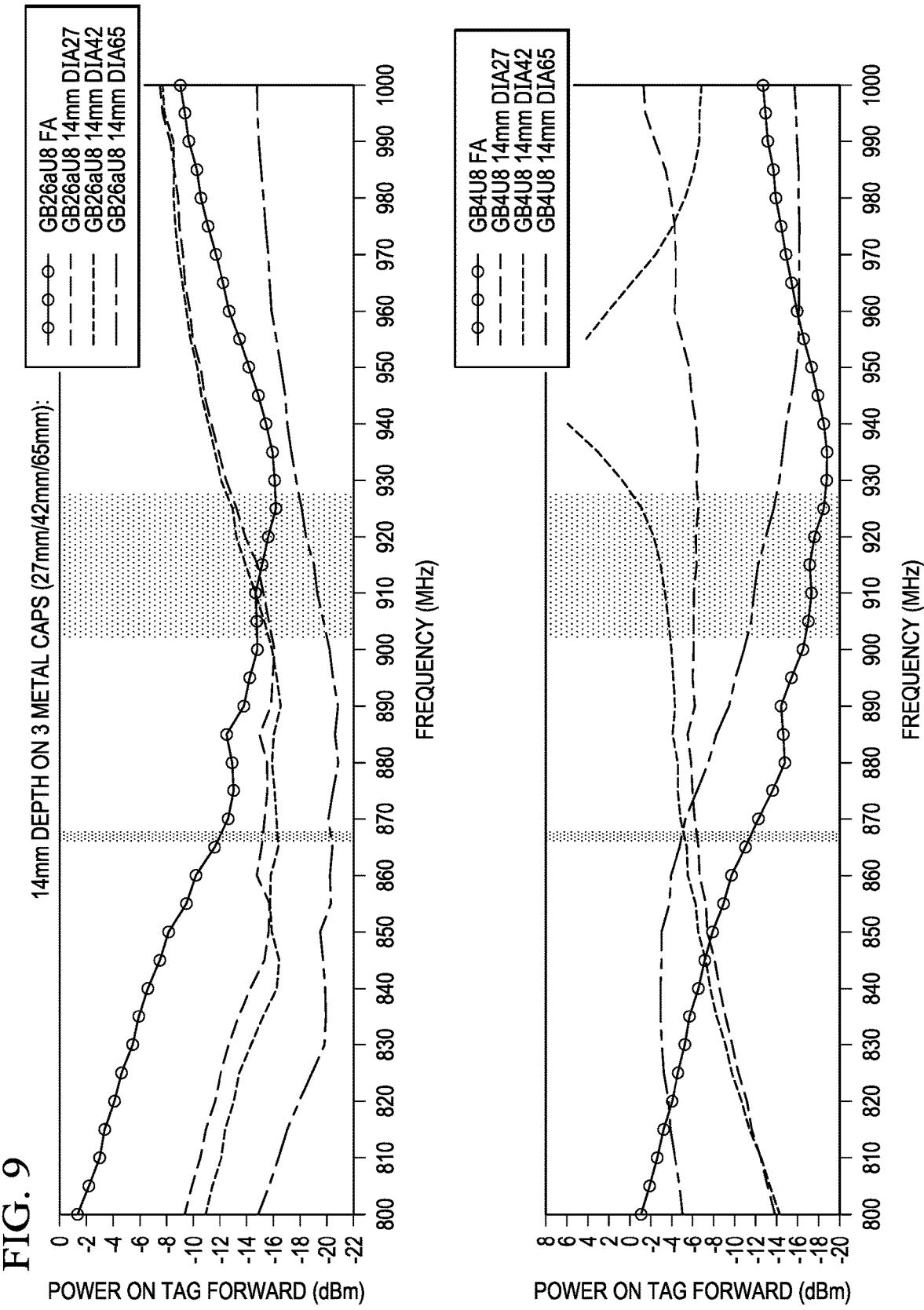
FIG. 9 illustrates graphs of an operational characteristic of the exemplary prior art RFID inlay and exemplary "self-tuning" RFID inlay for a first test case having a 14 mm installation depth on metal caps having diameters of 27 mm, 42 mm and 65 mm.
Figure 10:
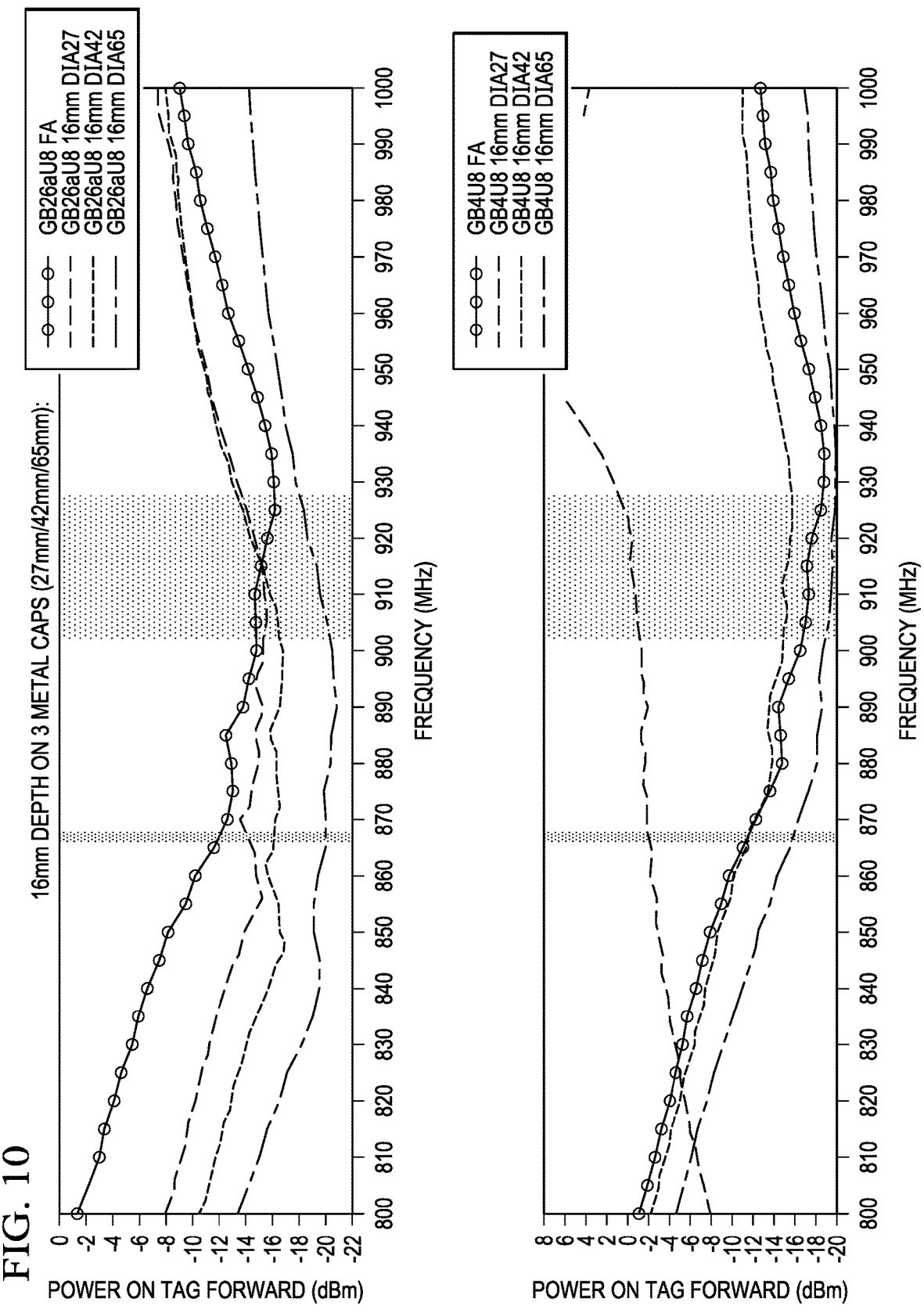
FIG. 10 illustrates graphs of an operational characteristic of the exemplary prior art RFID inlay and exemplary "self-tuning" RFID inlay for a second test case having a 16 mm installation depth on metal caps having diameters of 27 mm, 42 mm and 65 mm.
Figure 11:
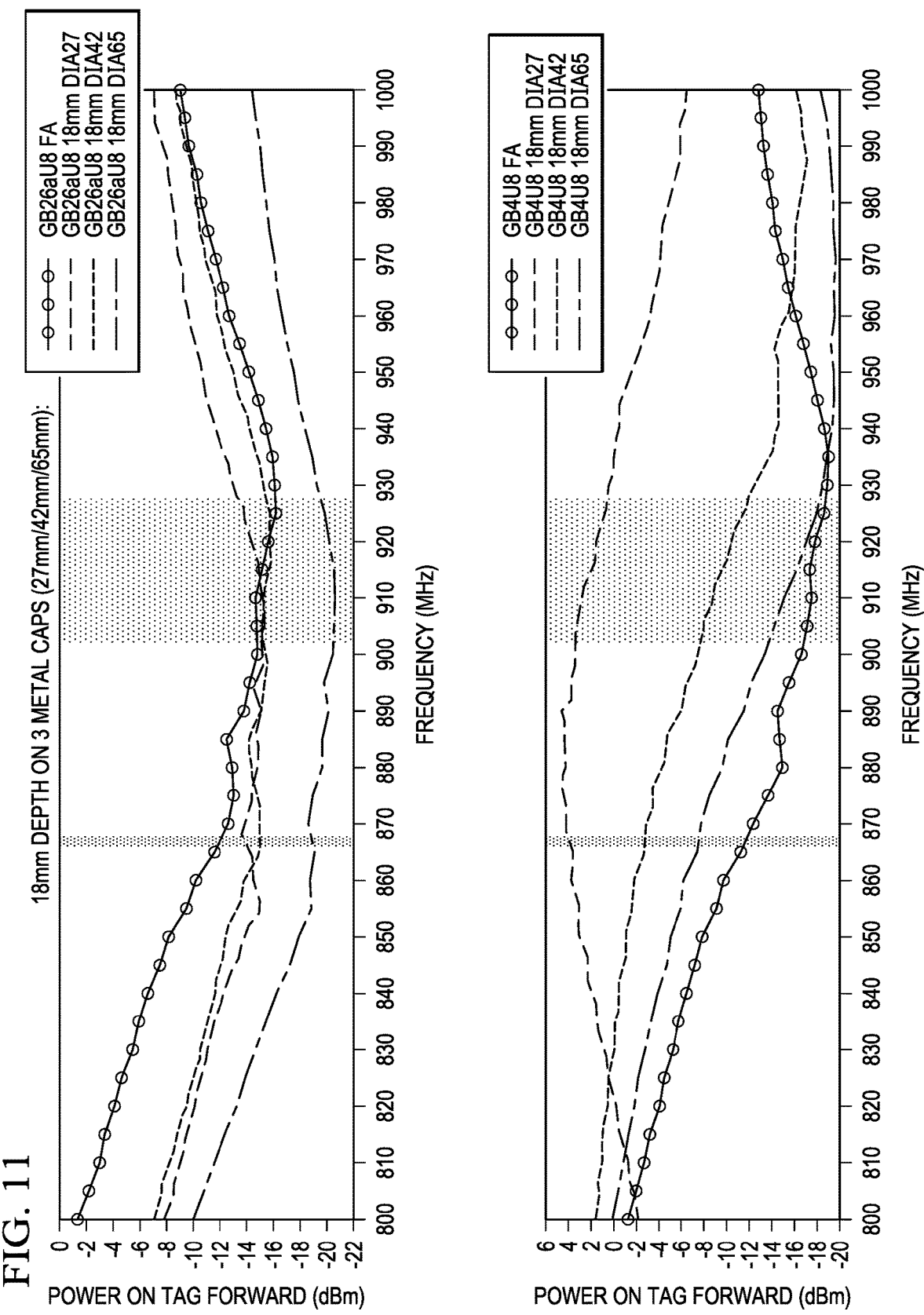
FIG. 11 illustrates graphs of an operational characteristic of the exemplary prior art RFID inlay and exemplary "self-tuning" RFID inlay for a third test case having a 18 mm installation depth on metal caps having diameters of 27 mm, 42 mm and 65 mm.
Figure 12:
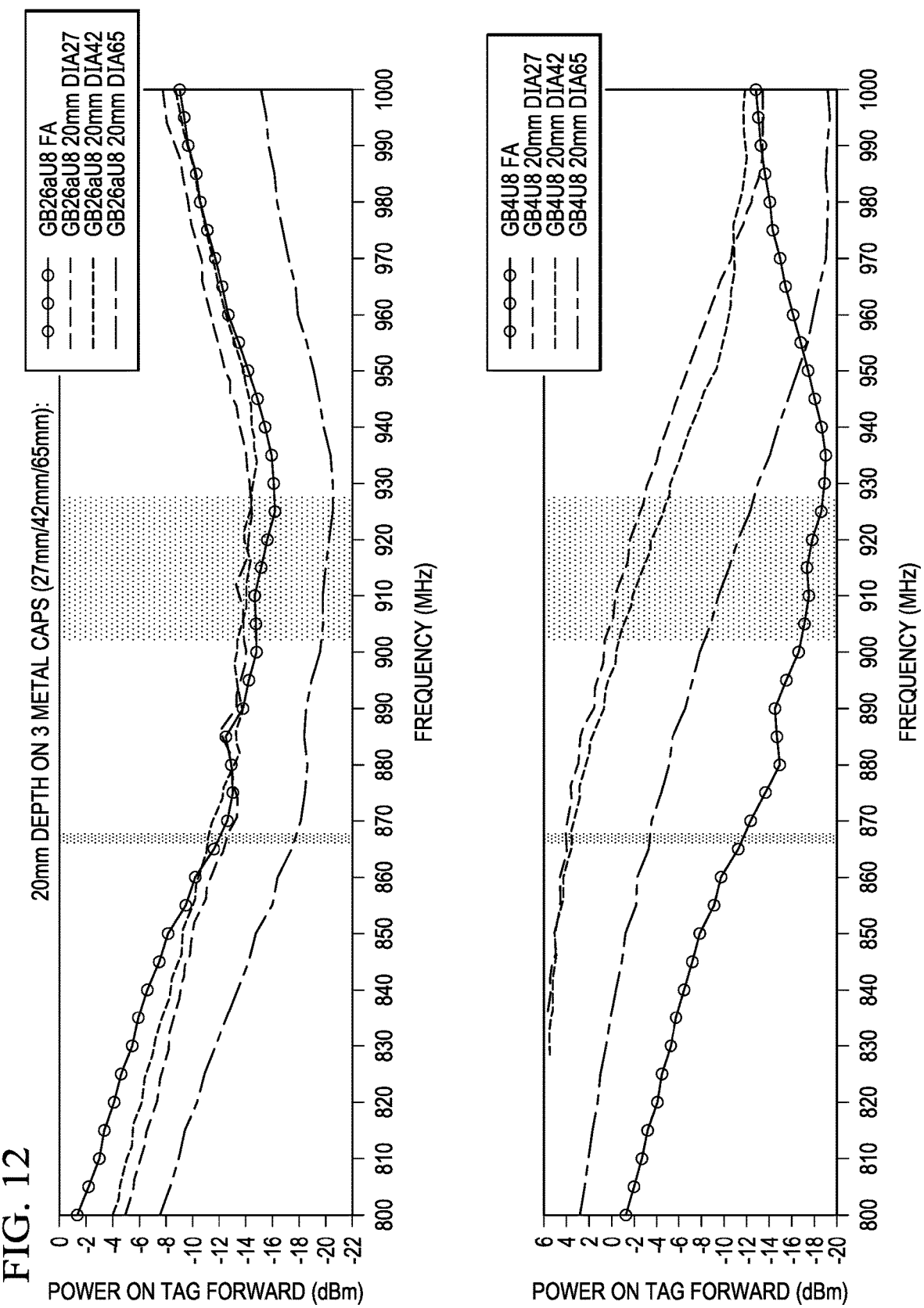
FIG. 12 illustrates graphs of an operational characteristic of the exemplary prior art RFID inlay and exemplary "self-tuning" RFID inlay for a fourth test case having a 20 mm installation depth on metal caps having diameters of 27 mm, 42 mm and 65 mm.
Figure 13:
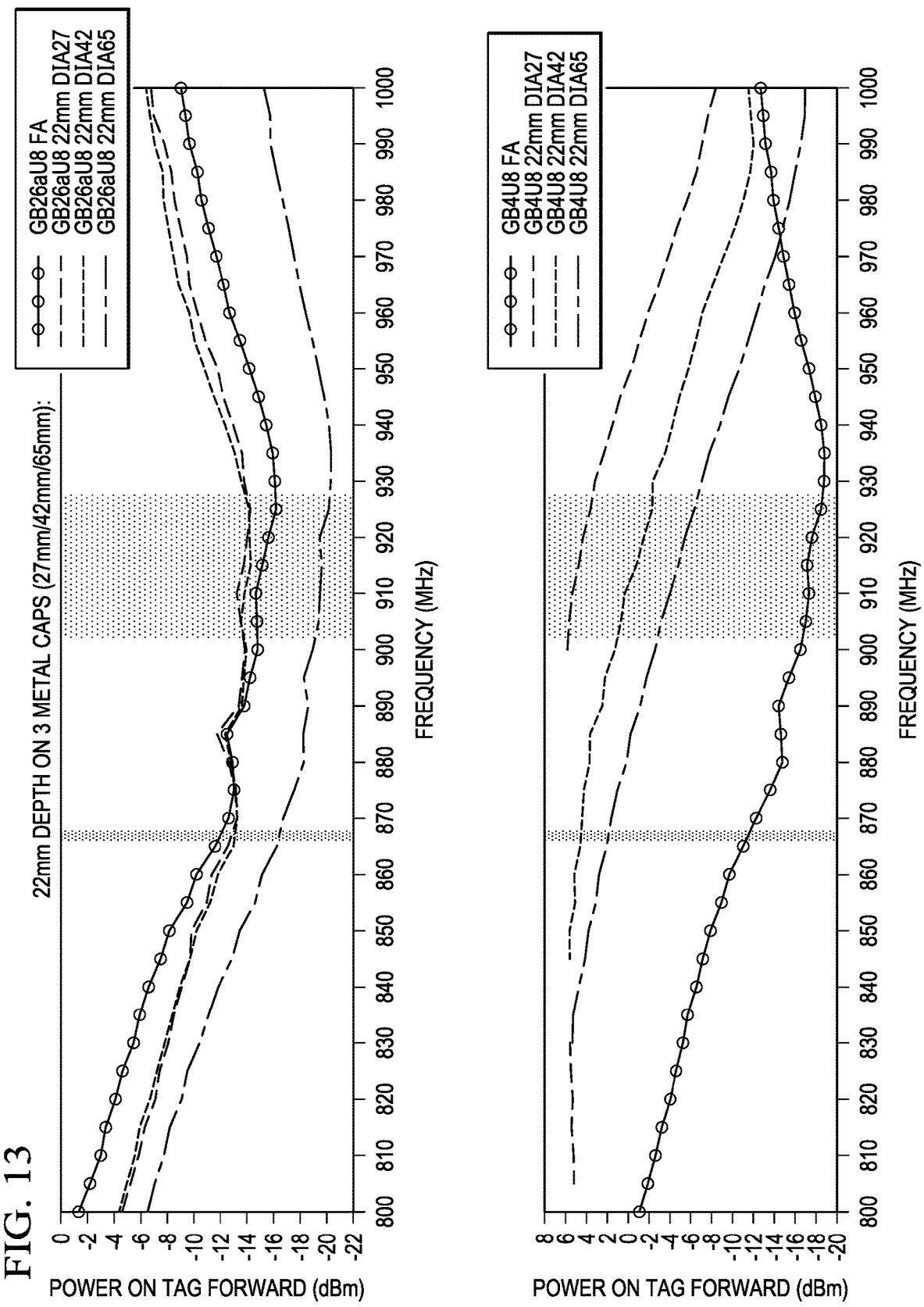
FIG. 13 illustrates graphs of an operational characteristic of the exemplary prior art RFID inlay and exemplary "self-tuning" RFID inlay for a fifth test case having a 22 mm installation depth on metal caps having diameters of 27 mm, 42 mm and 65 mm.

With reference to FIG. 9, the upper graph illustrates the test results for the self-tuning RFID inlay (GB26aU8) 220 in free air (FA), as well as at an installation depth of 14 mm on metal cap sizes of 27 mm, 42 mm and 65 mm; the lower graph illustrates similar test results for the exemplary prior art RFID inlay (GB4U8) 210. As can be seen in the lower graph, the variance in the forward transmit power ("POWER ON TAG FORWARD (dBm)") required to effectively read the tag is significant for the GB4U8, both as a function of the size of the metal cap and across the preferred 902-928 MHz frequency band. In contrast, as seen in the upper graph, the GB26aU8 has a flatter characteristic within that band of frequencies and the power is consistently lower and has little variation. Similar test results can be observed in FIGS. 10-13 for installation depths of 16 mm, 18 mm, 20 mm and 22 mm, respectively.

FIGS. 14, 15 and 16 illustrate the same data presented in FIGS. 9-13, but for each installation depth (14 mm/16 mm/18 mm/20 mm/22 mm) for each metal cap size of 27 mm, 42 mm and 65 mm, respectively. For example, the upper graph of FIG. 14 illustrates the test results for the self-tuning RFID inlay (GB26aU8) in free air (FA), as well as at an installation depth of 14 mm, 16 mm, 18 mm, 20 mm and 22 mm on a metal cap size of 27 mm; the lower graph illustrates similar test results for the exemplary prior art RFID inlay (GB4U8). As can be seen in the lower graph, the variance in the forward transmit power required to effectively read the tag is significant for the GB4U8 for all installation depths. In contrast, as seen in the upper graph, the GB26aU8 has a flatter characteristic within the same band of frequencies and the power is consistently lower and has little variation for all installation depths. Similar test results can be seen in FIGS. 15 and 16 for metal cap sizes of 42 mm and 65 mm, respectively.

Figure 17:
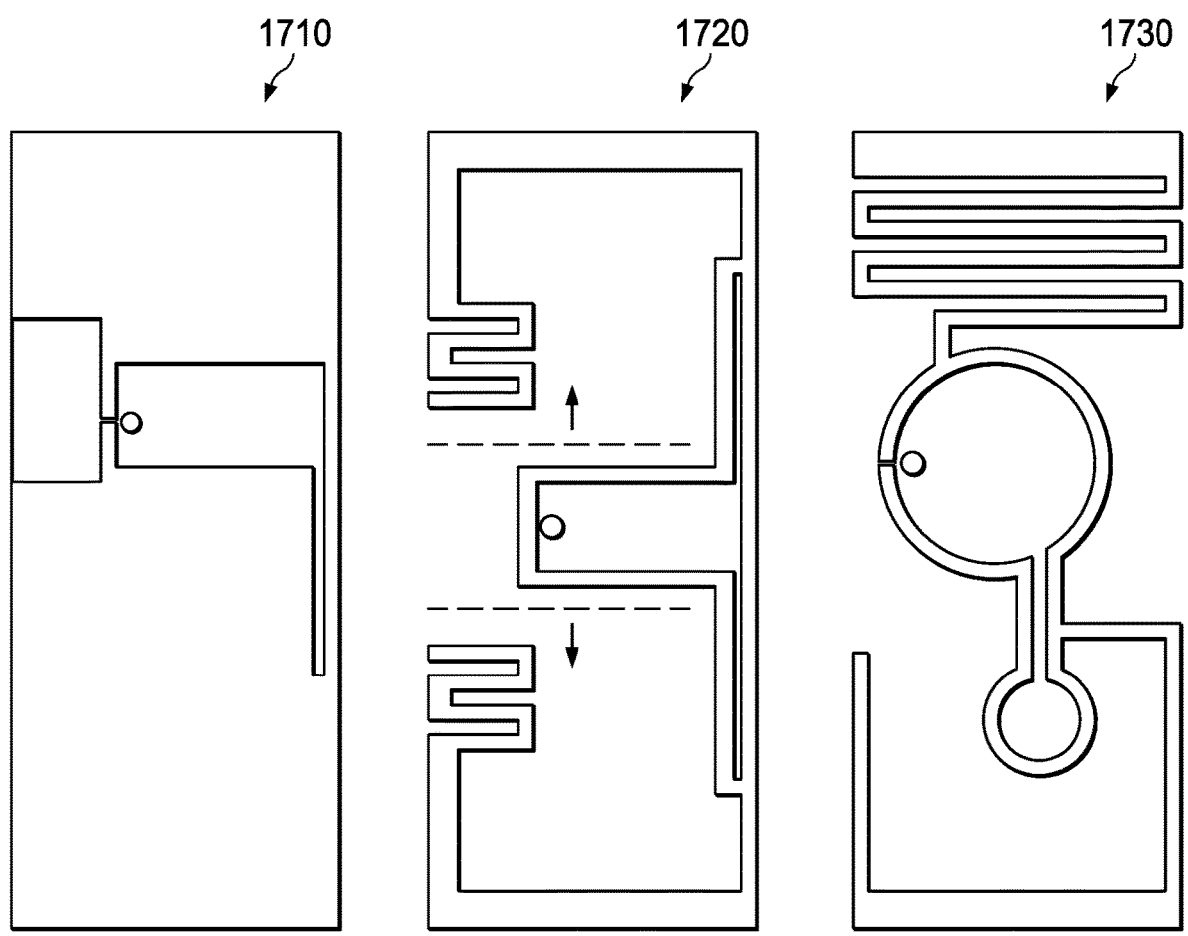

The foregoing illustrates that a "self-tuning" (alternatively, "self-adjusting", "self-compensating", "auto-adjusting" or "auto-compensating", without limitation) RFID inlay can be designed by selective configuration of relative portions of the RFID dipole and loop antennas that will overlay a product surface; particularly for products/packages having a metallic surface or liquid contents. From a design standpoint, starting from a given dipole layout, a portion of the loop antenna is preferably designed to extend into the mounting zone for an inlay such that it will progressively and positively shift the operational frequency of the inlay to compensate for the negative shift attributable to the dipole portion as the overlap of the inlay on the product surface is progressively increased. Alternatively, the design of an inlay could progress from a given layout for a portion of the loop antenna within the mounting zone, designing the dipole portion in the mounting zone to progressively and negatively shift the operational frequency of the inlay to compensate for the positive shift attributable to the loop portion as the overlay of the inlay on the product surface is progressively increased. The overall design of the inlay can be symmetrical or non-symmetrical, and the dipole and loop antennas can have any desired shape, provided that a portion of the loop needs to be located on the part of tag to be affixed to a product (e.g., the "mounting zone" or "attachment region"); the portion is adjusted relative to the portion of the dipole also located on the part of tag to be affixed to a product. Some exemplary alternative designs are illustrated in FIG. 17, including both non-symmetrical designs 1710, 1730 and symmetrical design 1720; other designs are contemplated within the scope of the principles disclosed herein.

We claim:

1. A radio-frequency identification (RFID) tag for use on an object, wherein an operational characteristic of said RFID tag is susceptible to influence by a material comprising said object, said RFID tag comprising:
    a substrate comprising an attachment region and a flap region, said attachment region adapted for coupling said RFID tag to a surface of said object; and
    an RFID inlay formed on said substrate, said RFID inlay comprising a loop antenna and a dipole antenna, said loop antenna and said dipole antenna each having first and second portions within said flap and attachment regions, respectively, wherein said second portion of said loop antenna within said attachment region has a relative positive influence on said operational characteristic when attached to said object and said second portion of said dipole antenna within said attachment region has a relative negative influence on said operational characteristic, whereby a net influence on said operational characteristic of said material comprising said object to which said RFID tag will be attached can be minimized.

2. The RFID tag recited in claim 1, wherein said substrate is physically defined by a first edge and a second edge and a central folding location, said attachment region comprising a region of said substrate between said central folding location and said first edge and said flap region comprising a region of said substrate between said central folding location and said second edge.

3. The RFID tag recited in claim 1, wherein said relative positive influence of said loop antenna within said attachment region on said operational characteristic increases with a surface area of said object to which said attachment region is coupled.

4. The RFID tag recited in claim 1, wherein said relative negative influence of said dipole antenna within said attachment region on said operational characteristic increases with a surface area of said object to which said attachment region is coupled.

5. The RFID tag recited in claim 1, wherein said operational characteristic is a power on tag forward required to effectively read said RFID tag at a desired operational frequency.

6. The RFID tag recited in claim 5, wherein said desired operational frequency is within a 902-928 MHz band.

7. The RFID tag recited in claim 5, wherein said power on tag forward is relatively consistent for use of said RFID tag on objects comprising substantially different materials.

8. The RFID tag recited in claim 1, wherein said operational characteristic is a sensitivity of said RFID tag at a desired operational frequency.

9. The RFID tag recited in claim 1, wherein said first and second portions of said dipole antenna originate at a location within said flap region.

10. The RFID tag recited in claim 9, wherein said first portion of said dipole antenna is wholly positioned within said flap region of said substrate and wherein said second portion of said dipole antenna extends from said flap region into said attachment region of said substrate.

11. The RFID tag recited in claim 9, wherein said first and second portions of said dipole antenna within said flap region and said attachment region, respectively, are not symmetrical.

12. The RFID tag recited in claim 1, wherein said first and second portions of said loop antenna are primary and secondary portions, respectively, and at least a part of said secondary portion is positioned within said attachment region.

13. The RFID tag recited in claim 12, wherein said secondary portion of said loop antenna comprises an elongated stub.

14. The RFID tag recited in claim 13, wherein said elongated stub is oriented such that progressively more of said elongated stub overlays said object as a greater area of said attachment region is affixed to said object.

15. The RFID tag recited in claim 1, wherein said object to which said RFID tag can be attached comprises a container formed from metal, paper, plastic, or glass.

16. The RFID tag recited in claim 15, wherein said object further comprises a material within said container.

17. The RFID tag recited in claim 16, wherein said material within said container comprises a liquid.

18. The RFID tag recited in claim 1, wherein said flap region of said substrate is adapted to extend away from said surface of said object.

19. The RFID tag recited in claim 1, wherein said substrate comprises first and second opposing surfaces and said RFID inlay is located on only said first surface.

20. The RFID tag recited in claim 1, further comprising an adhesive means disposed on at least a portion of said substrate in said attachment region, said adhesive means suitable for fixedly attaching said RFID tag to said surface of said object.

21. The RFID tag recited in claim 1, wherein said RFID tag is passive.

* * * * *